W. ADAMSON.
TREATING SUBSTANCES WITH HYDROCARBON VAPOR.
No. 183,097. Patented Oct. 10, 1876.
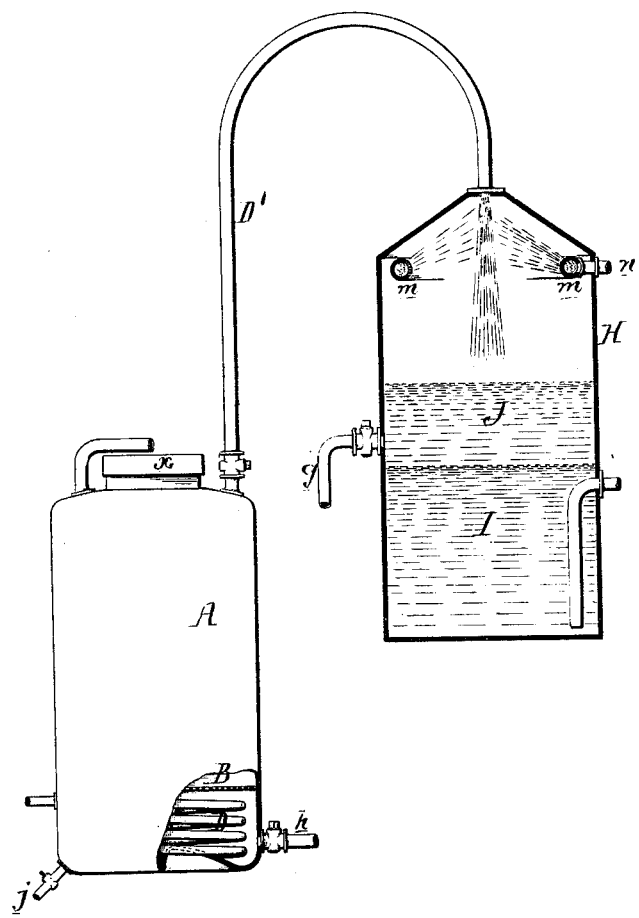

UNITED STATES PATENT OFFICE.

WILLIAM ADAMSON, OF PHILADELPHIA, PENNSYLVANIA.

IMPROVEMENT IN TREATING SUBSTANCES WITH HYDROCARBON VAPOR.

Specification forming part of Letters Patent No. 183,097, dated October 10, 1876; application filed August 17, 1876.

*To all whom it may concern:*

Be it known that I, WILLIAM ADAMSON, of Philadelphia, Pennsylvania, have invented an Improvement in Treating Substances with Hydrocarbon Vapor, of which the following is a specification:

My invention relates to an improvement in the mode of treating animal and vegetable substances by hydrocarbon vapor, for the purpose of extracting therefrom oils, fats, resin, &c., for cleansing different materials, and for preserving animal and vegetable substances. For example of this process I may refer to my patents No. 117,135, No. 117,136, No. 118,668, and to my reissued patents No 5,610, No. 5,611, and No. 5,612.

The object of my present improvement is to prevent the fetid or other odors imparted to the vapor from the substances treated from being recommunicated to the said substances and to the extracts therefrom through the medium of the vapor from the reused hydrocarbon.

The accompanying drawing represents, partly in section, apparatus whereby my invention may be carried into effect.

A is a vessel, in which the substances have to be treated by hydrocarbon vapor, the said substances being introduced into the vessel through a man-hole, $x$, and deposited on a perforated diaphragm, B, the man-hole being provided with a suitable cover. A steam-coil, D, is placed in the vessel in a space beneath the diaphragm, and liquid hydrocarbon is introduced into the said space, and is there vaporized by the steam-coil. The vapor rising through the perforated diaphragm permeates the substance upon the same, so as to extract therefrom the oily, fatty, or resinous matter, which passes downward through the diaphragm into the space below the same, whence it may be drawn off from time to time through the discharge-pipe $j$. Liquid hydrocarbon may be introduced from a tank or from a source explained hereafter into the top of the vessel A, so that it will pass through the material and be vaporized when it reaches the coil, the said material being in this case subjected to a downward current of liquid hydrocarbon and an upward current of vapor.

It has been my practice, as described in the above-mentioned patents, to cause the vapor after acting on the substances in the vessel to pass through a worm in a condenser, the lower end of the worm communicating with the vessel A beneath the diaphragm, so that the hydrocarbon was used over and over again.

I have found in practice that this is objectionable in many cases, for the following reason: In treating animal offal, for instance, for the extraction of fats, fetid odors are imparted to the hydrocarbon vapor, and remain, to a considerable extent, in the condensed vapor when the latter is restored to the vessel A; hence the fetid odors were recommunicated both to the fatty extracts and to the material. The same objections have been experienced in treating meat for preservation and vegetable matter for the extraction of oil by hydrocarbon vapor.

I obviate this difficulty in the following manner: The vapor-pipe D′ communicates with a vessel, H, at the top of the same, and the vapor is met by numerous small jets of cold water—in the present instance, from a perforated tubular ring, $m$, into which the water is forced through a pipe, $n$.

Many different appliances may be used, such as roses, revolving jets, &c., for causing a spray through which the vapor must pass, and by which it must be condensed. The result of this will be a supply, I, of tainted water on the bottom of the vessel H, and a quantity, J, of washed and purified hydrocarbon above the water, the latter having taken up the fetid odors.

The washed hydrocarbon may be drawn off through a pipe, $g$, into any suitable vessel, and thence introduced through the pipe $h$ into the vessel A, or may pass directly into the latter to be again vaporized therein, the vapor after permeating the material and passing through the pipe D′ being simultaneously condensed and washed in the vessel H, preparatory to being returned, in the condition of purified liquid hydrocarbon, to the vessel A.

By the practice of this process I am enabled to obtain a purer extract than heretofore, and, at the same time, the substances acted upon are more free from noxious odors.

It is not essential to adhere to the apparatus illustrated and described in carrying out my invention. The vessel A may, for instance, consist of a horizontal hollow cylinder, and the vaporizing of the hydrocarbon may be accomplished otherwise than by a steam-coil.

The construction of the apparatus may, in fact, in a great measure depend on the locality which it has to occupy.

I claim as my invention—

As an improvement in treating animal or vegetable substances with hydrocarbon for the purpose of extracting from such substances oils, fats, resins, &c., for cleansing different materials, and for preserving the substances, the within-described process consisting of, first, causing the vapor to pass through the substances to be treated in one vessel, then causing this vapor to be simultaneously washed and condensed in another vessel, separating the washed and purified hydrocarbon from the foul water, and, finally, returning the hydrocarbon to be revaporized in the first vessel, all substantially as and for the purpose set forth.

In testimony whereof I have signed my name to this specification in the presence of two subscribing witnesses.

WILLIAM ADAMSON.

Witnesses:
  HARRY HOWSON, Jr.,
  HARRY SMITH.